(12) United States Patent
Friedrich et al.

(10) Patent No.: US 7,066,168 B1
(45) Date of Patent: Jun. 27, 2006

(54) CONVECTION OVEN FOR BAKERY GOODS

(75) Inventors: Robert J. Friedrich, Greensboro, NC (US); Jennifer Friedrich-Prago, Greensboro, NC (US)

(73) Assignee: Friedrich Metal Products Co., Inc., Greensboro, NC (US)

( * ) Notice: Subject to any disclaimer, the term of this patent is extended or adjusted under 35 U.S.C. 154(b) by 61 days.

(21) Appl. No.: 10/984,206

(22) Filed: Nov. 9, 2004

Related U.S. Application Data

(62) Division of application No. 10/234,500, filed on Sep. 4, 2002, now Pat. No. 6,854,456.

(51) Int. Cl.
*A21B 1/08* (2006.01)

(52) U.S. Cl. ...................... 126/20; 126/21 R

(58) Field of Classification Search .............. 126/20, 126/21 R; 34/196, 197; 99/447; 432/176, 432/199; 426/523
See application file for complete search history.

(56) References Cited

U.S. PATENT DOCUMENTS

| | | | |
|---|---|---|---|
| 1,345,107 A | 5/1920 | Rinck | |
| 3,537,405 A | 11/1970 | Verhoeven | |
| 3,595,178 A | 7/1971 | Dahlen | |
| 3,861,378 A | 1/1975 | Rhoads et al. | |
| 3,905,760 A | 9/1975 | Johansson et al. | |
| 3,954,053 A | 5/1976 | Johansson et al. | |
| 4,039,278 A | 8/1977 | Denholm | |
| 4,089,322 A | 5/1978 | Guibert | |
| 4,132,216 A | 1/1979 | Guibert | |
| 4,162,141 A | 7/1979 | West | |
| 4,202,259 A | 5/1980 | Johansson | |
| 4,484,517 A | 11/1984 | Amann | |
| 4,779,604 A | 10/1988 | Konig | |
| 4,782,214 A | 11/1988 | Voegtlin | |
| 4,785,151 A | 11/1988 | Voegtlin | |
| 4,892,083 A | 1/1990 | Konig | |
| 4,984,557 A | 1/1991 | Lonig | |
| 5,129,384 A | 7/1992 | Parks | |
| 5,228,385 A | 7/1993 | Friedrich et al. | |
| 5,394,791 A | 3/1995 | Vallee | |
| 5,615,603 A | 4/1997 | Polin | |
| 5,680,712 A | 10/1997 | Klyokawa et al. | |

(Continued)

FOREIGN PATENT DOCUMENTS

| | | |
|---|---|---|
| DE | 3428330 | 2/1985 |
| EP | 371845 | 6/1990 |

OTHER PUBLICATIONS

Brochure entitled Gemini Presents Dahlen Rack Ovens undated, possible prior art.

(Continued)

*Primary Examiner*—Alfred Basichas
(74) *Attorney, Agent, or Firm*—MacCord Mason PLLC

(57) ABSTRACT

A batch-type convection oven for bakery goods of the type having a front wall, a back wall, a pair of opposed side walls, a floor, a top and an opening in the front wall for permitting at least one multi-layer wheeled cart to be pushed into and removed from the oven. The oven includes a fan for circulating heated air in a closed path to the interior of the oven; a plenum attached to one wall of the oven, the plenum having at least one row of vertically arranged air outlets; an air return located in one wall of the oven for receiving the heated air after it has passed through the interior of the oven and for returning the air to the inlet of the fan and an air flow control system.

1 Claim, 15 Drawing Sheets

U.S. PATENT DOCUMENTS 6,516,712 B1    2/2003   Ratermann et al.
6,564,792 B1 *  5/2003   Bassoli et al. ............ 126/21 A
6,854,456 B1 *  2/2005   Friedrich et al. ......... 126/21 A
6,880,544 B1 *  4/2005   Hegge et al. .................. 126/20
6,909,069 B1 *  6/2005   Kerler et al. ............... 219/400

OTHER PUBLICATIONS

Brochure from Baker's Aid, Inc., entitled "The Baker's Aid Rotator Rack Oven. Designed To Rack Up Profits" undated, possible prior art.

* cited by examiner

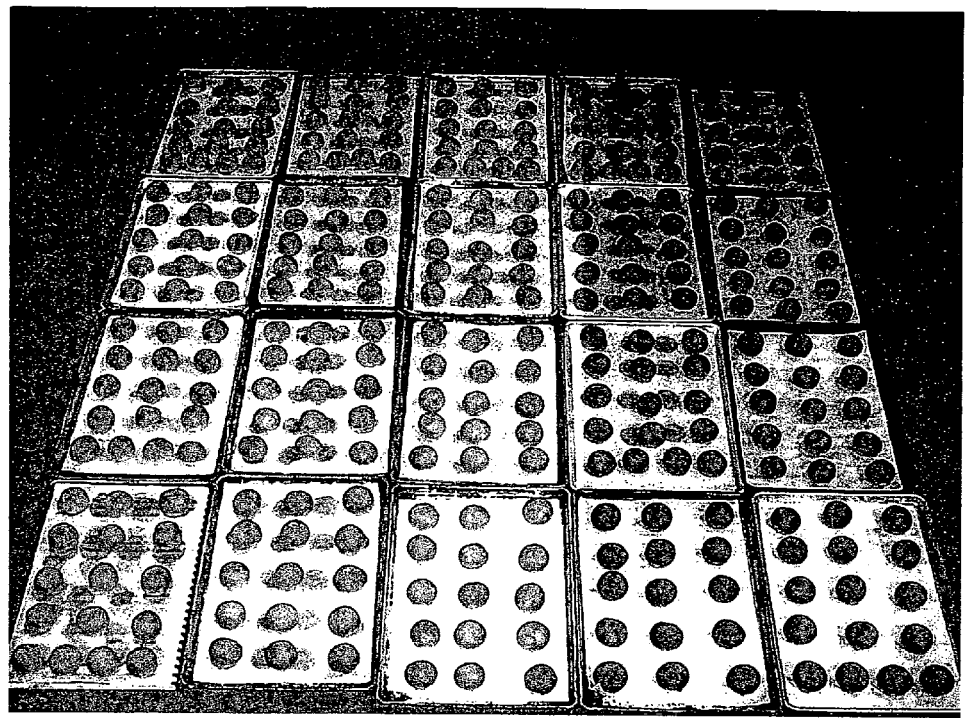
FIG. 8A
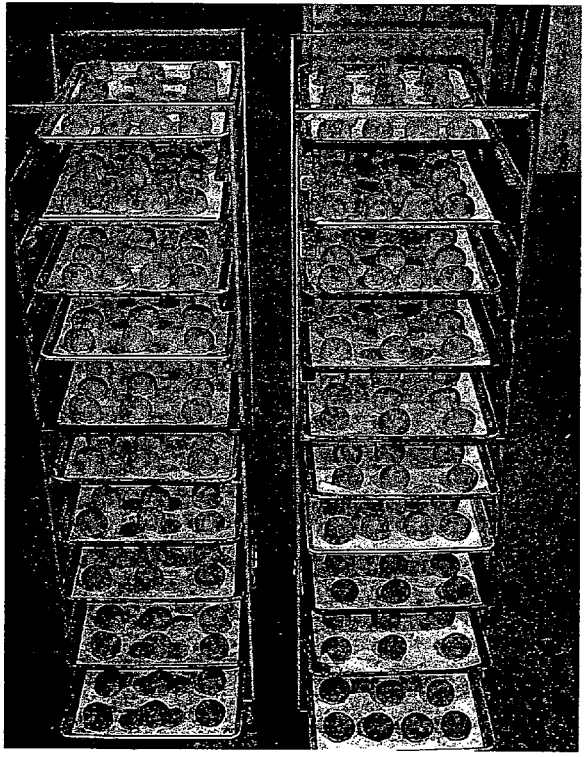
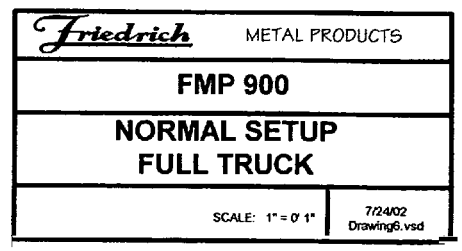

FIG. 11
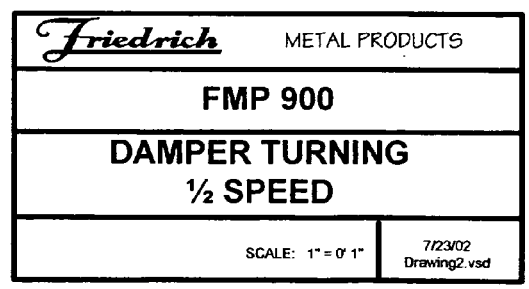

FIG. 12
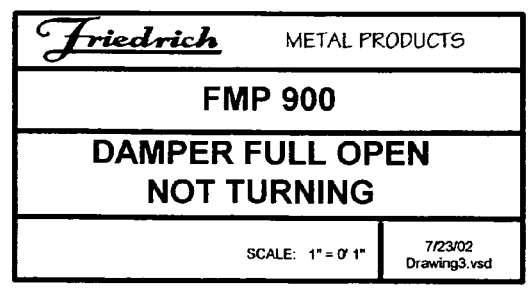

CONVECTION OVEN FOR BAKERY GOODS

This application is a division of Ser. No. 10/234,500, filed Sep. 4, 2002, now U.S. Pat. No. 6,854,456.

BACKGROUND OF THE INVENTION (1) Field of the Invention

The present invention relates generally to convection baking ovens, and more specifically, to an improved convection baking oven having at least one row of vertically arranged air outlets and an air flow control system.

(2) Description of the Prior Art

Rack ovens are chamber-type ovens in which the bakery products are supported on pans or other carriers in a rack. The rack is usually provided with wheels and can be moved into the oven chamber when loaded with the bakery products and moved from the oven chamber when the baking is completed.

In the past, various devices have been employed to conduct heated air over the bakery products being baked in the oven. Most of those devices have required various arrangements to move the bakery product or the supporting racks in order to provide even distribution and contact with the heated air passing through the oven.

The reason it has been necessary in the past to provide some kind of device in commercial ovens to cause movement of the bakery products within the oven baking chamber is to insure that the product will move through the variable heat zones for uniform distribution and for even baking or processing. In contrast, small home use ovens have such a limited volume that it is not necessary to move the product around in the oven to achieve satisfactory baking.

In addition to moving the rack, other arrangements have been utilized to provide for even flow across the baked goods. One type of oven popular for baking is an oven in which a portion of the flue gases from a firebox located under the baking chamber enters a plurality of ports going from near the top of to near the bottom of the oven chamber to cause a downwardly directed current of heated air to thereby mix and circulate the gaseous contents of the oven chamber and prevent it from separating into different layers and pockets of different temperatures. However, such an arrangement would not be adaptable to rack ovens in which the oven chamber is even with the floor of the bakeshop.

Another type is an oven in which a control means delivers various amounts of heated air through an alternating pattern of jet orifices on opposite sides of the oven. Hot air from the jets on the opposite sides of the oven meet in an area of common velocity in the chamber to produce turbulent mixing of the hot air in a vertical plane. The air pressure is varied between the hot air jets and the opposite side walls to cause the vertical plane of turbulent heat air to sweep back and forth through the chamber, thereby contacting the entire product. However, like the other prior art bakery ovens, this arrangement requires additional moving parts in order to continuously vary the air pressure.

In addition, bakers sometimes use an oven having a baking chamber in which air channels on both sides are provided with warm air by a blower through a series of small slots, which-extend over the depth of baking chamber. The heated air introduced into the oven is returned to the blower by means of an air passage opening in the adjacent wall. However, such an arrangement is complex, bulky and expensive to construct.

One approach to trying to solve these problems is disclosed in U.S. Pat. No. 5, 228, 385, issued Jul. 20, 1993, and commonly owned by Applicant. This convection oven included a fan located in the top of the oven for circulating heated air in a closed path through the interior of the oven and a plenum located in the pair of opposed sidewalls adjacent to the sidewall having the opening. The plenum extended substantially from the top to the floor of each sidewall and included a plurality of horizontal air outlet slots extending substantially the depth of the oven. The horizontal air outlet slots were arranged with a 1:1 correspondence with respect to each rack of the multilayer wheeled cart. Heat recovery means was located in the plenum portion of the opposed sidewalls and an inlet was located in the top of the oven adjacent to the fan for receiving the air after it has passed through the interior of the oven and returning the air to the inlet of the fan. However, even this type of oven could not produce baked goods having the near perfect uniformity associated with continuous type ovens.

Thus, there remains a need for a new and improved batch-type convection baking oven which provides at least one row of vertically arranged air outlets for even baking of the bakery goods in the rack while, at the same time, includes an air flow control system which is simple to construct and maintain.

SUMMARY OF THE INVENTION

The present invention is directed to a batch-type convection oven for bakery goods of the type having a front wall, a back wall, a pair of opposed side wall, a floor, a top and an opening in the front wall for permitting at least one multi-layer wheeled cart to be pushed into and removed from the oven. The oven includes a fan for circulating heated air in a closed path to the interior of the oven; a plenum attached to one wall of the oven, the plenum having at least one row of vertically arranged air outlets; an air return located in one wall of the oven for receiving the heated air after it has passed through the interior of the oven and for returning the air to the inlet of the fan and an air flow control system.

In the preferred embodiment the apparatus further includes a second row of vertically arranged air outlets adjacent to the same wall as the first row. Also, in the preferred embodiment, the second row of vertically arranged air outlets is on the same wall as the first row.

Also, the vertically arranged air outlets extend from the floor of the oven and are spaced apart from the top of the oven for reducing the volume of heated air adjacent to the top of the oven. Preferably, the vertically arranged air outlets are spaced apart from one another by about every 4 inches (about 3 outlets per foot). In addition, the plenum may further include an air direction baffle between the fan and the air outlets.

In the preferred embodiment, the airflow control system includes an alternating baffle system. More preferably, the alternating baffle system is a partial alternating baffle system, wherein less than about 80% of the air is baffled. Preferably, the partial dampening ratio of baffled air to un-baffled air is about 70/30.

Also, in the preferred embodiment, the capacity of the fan is about 1200 CFM and the volume of the oven is about 120 cubic feet. Thus, the ratio of the capacity of the fan to the volume of the oven produces about 10 air changes per minute.

In the preferred embodiment, the air return is located at the bottom of one of the sidewalls for reducing variations in top to bottom heating within the oven. The air return may also include a low air resistant grate surface. The low air resistant grate surface preferably includes a plurality of inwardly flared apertures.

Accordingly, one aspect of the present invention is to provide a convection oven for bakery goods of the type having a front wall, a back wall, a pair of opposed side walls, a floor, a top and an opening in the front wall for permitting at least one multi-layer wheeled cart to be pushed into and removed from the oven, the oven including: a fan for circulating heated air in a closed path to the interior of the oven; a plenum attached to one wall of the oven, the plenum having at least one row of vertically arranged air outlets; and an air return located in one wall of the oven for receiving the heated air after it has passed through the interior of the oven and for returning the air to the inlet of the fan.

Another aspect of the present invention is to provide a convection oven for bakery goods of the type having a front wall, a back wall, a pair of opposed side walls, a floor, a top and an opening in the front wall for permitting at least one multi-layer wheeled cart to be pushed into and removed from the oven, the oven including a fan for circulating heated air in a closed path to the interior of the oven; a plenum attached to one wall of the oven, the plenum having at least one row of vertically arranged air outlets having outwardly flared ends; and an air return located in one wall of the oven for receiving the heated air after it has passed through the interior of the oven and for returning the air to the inlet of the fan.

Still another aspect of the present invention is to provide a convection oven for bakery goods of the type having a front wall, a back wall, a pair of opposed side wall, a floor, a top and an opening in the front wall for permitting at least one multi-layer wheeled cart to be pushed into and removed from the oven, the oven including: a fan for circulating heated air in a closed path to the interior of the oven; a plenum attached to one wall of the oven, the plenum having at least one row of vertically arranged air outlets having outwardly flared ends; an air return located in one wall of the oven for receiving the heated air after it has passed through the interior of the oven and for returning the air to the inlet of the fan, and an air flow control system.

These and other aspects of the present invention will become apparent to those skilled in the art after a reading of the following description of the preferred embodiment when considered with the drawings.

BRIEF DESCRIPTION OF THE DRAWINGS

FIG. 8A is photograph of baked goods baked according to the present invention where 95% of the baked goods on the cart are within 50% of the mean doneness value of all baked goods on the cart;

FIG. 11 is photograph of baked goods baked according to the present invention at about 70/30 partial dampening at 5 air changes per minute where 95% of the baked goods on the cart are within 2% of the mean doneness value of all baked goods on the cart;

FIG. 12 is photograph of baked goods baked according to the present invention without partial dampening at 10 air changes per minute where 95% of the baked goods on the cart are within 16% of the mean doneness value of all baked goods on the cart;

DESCRIPTION OF THE PREFERRED EMBODIMENTS

Figure 1:
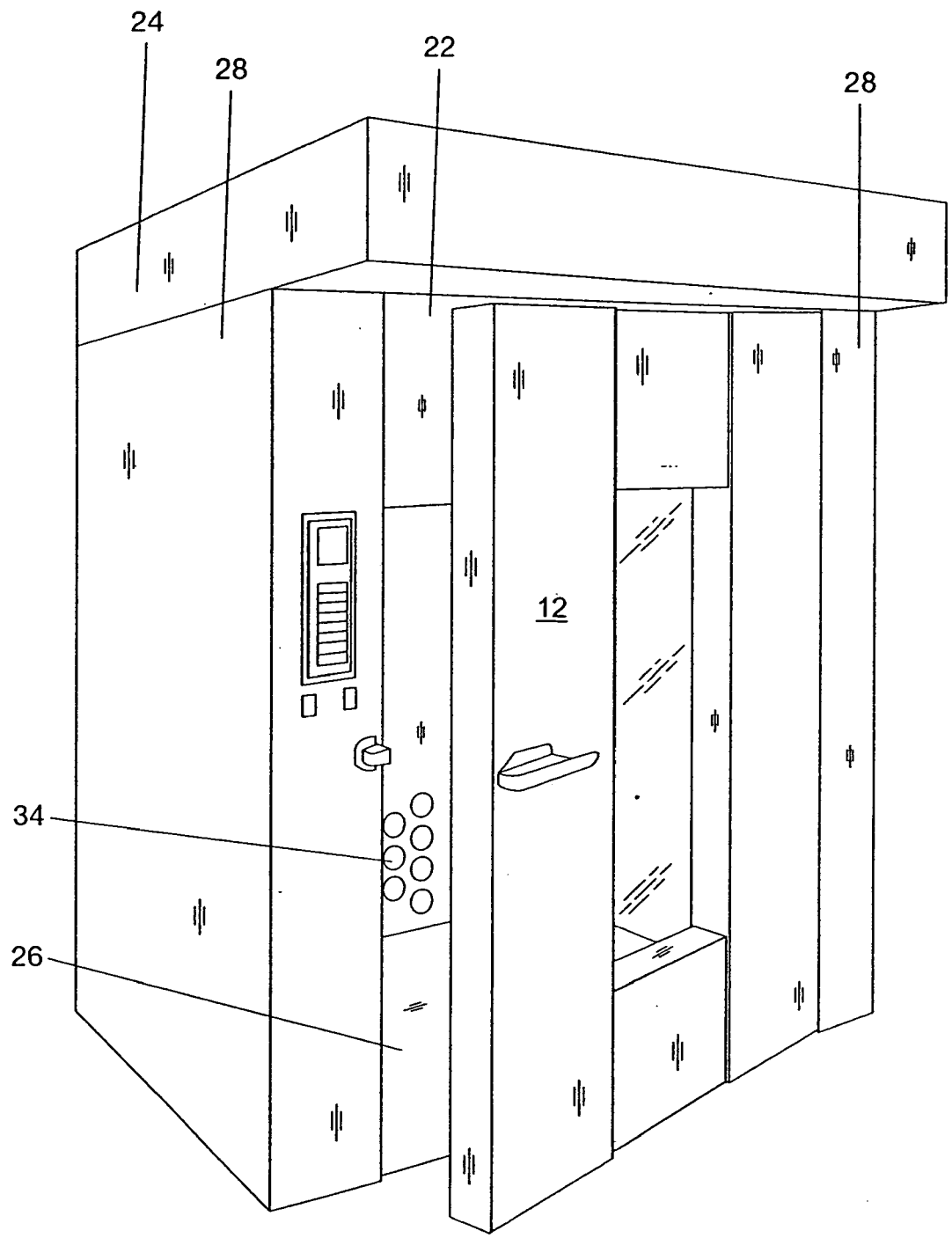
FIG. 1 is a perspective view of a convention oven according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, an oven, generally designated 10, is shown constructed according to the present invention. Oven 10 includes an opening in the front wall 22, having a door 12. The oven further includes a top 24, a floor 26 and opposing sidewalls 28. Near the top 24 of the oven 10 is a fan 30 for circulating air. The fan 30 has a capacity of about 1200 CFM where the volume of the oven is about 120 cubic feet. Thus, in the preferred embodiment, the fan 30 creates about 10 air changes per minute in the oven.

Figure 2:
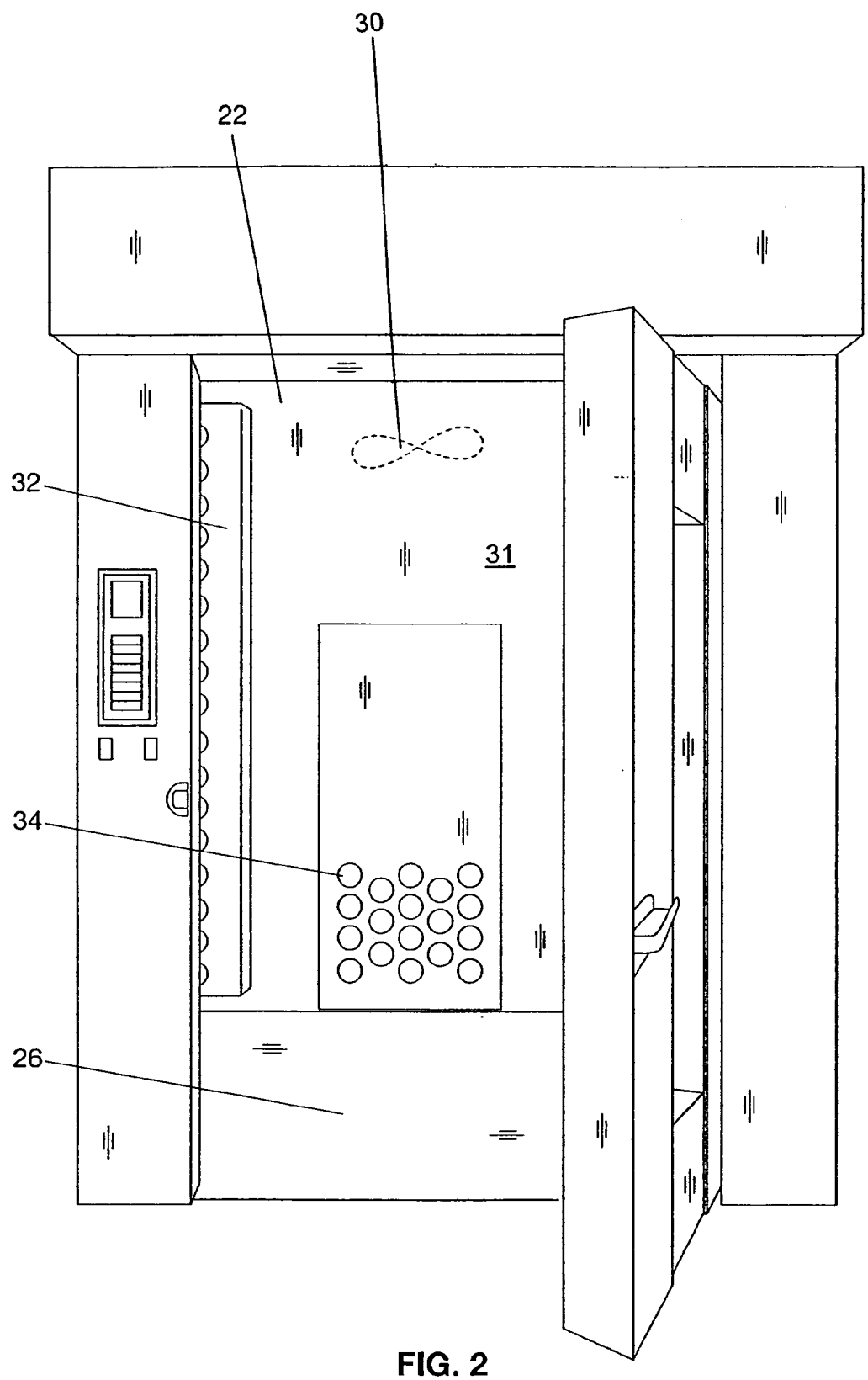
FIG. 2 is a front view of the convection oven.

Turning now to FIG. 2, the oven 10 further includes an inside back wall 31. Adjacent to the inside back wall 31 is a plenum 32 for circulating air through the oven. Along the back wall 31, near the floor 26 of the oven 10, an air return 34 for returns air from the inside of the oven 10 to the plenum 32. The air return 34 is a low air resistance surface and, in the preferred embodiment, includes inwardly flared apertures for reducing the drag of the returning air from inside the oven 10.

Figure 3:
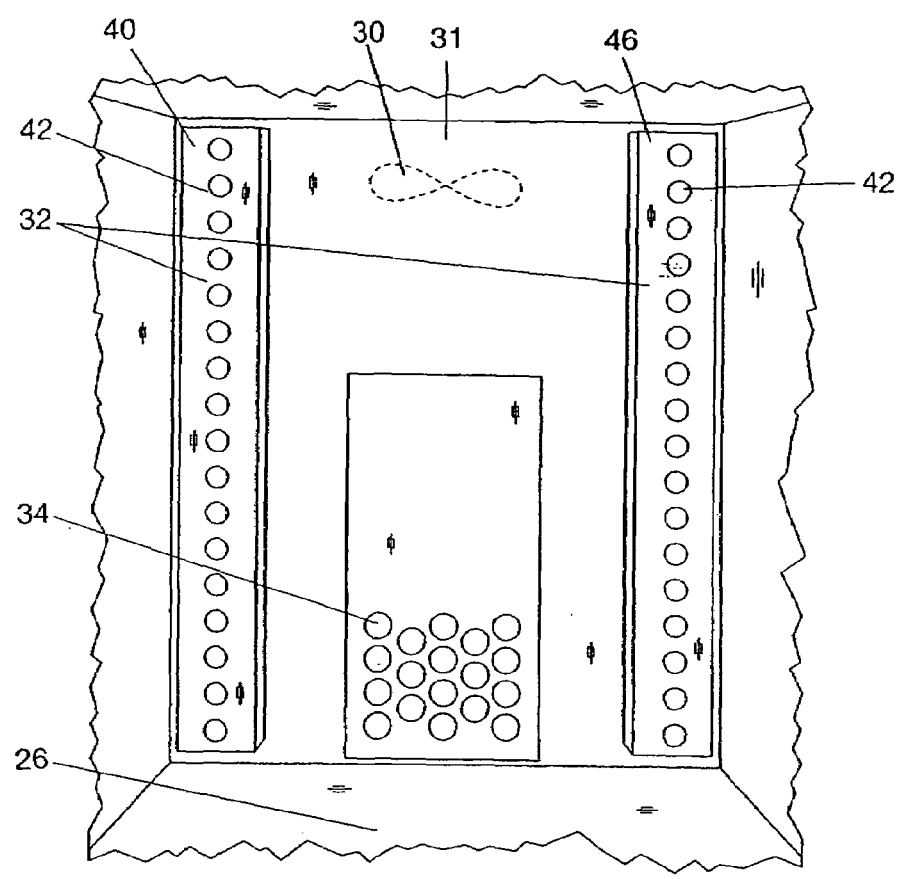
FIG. 3 is a front view of the inside of the convection oven.

As best seen in FIG. 3, the plenum 32 further includes at least one row of vertically arranged airflow outlets 40 and, in the preferred embodiment, a second row of vertically arranged airflow outlets 46 along the same wall as the first row of outlets 40. The vertically arranged airflow outlets 40, 46 extend from the floor 26 of the oven to near the top 24 because better baking results when the vertically arranged airflow outlets 40, 46 do not extend all the way to the top 24 of the oven. The vertically arranged airflow outlets 40, 46 further include outwardly flared ends 42 for directing airflow through the oven. The outwardly flared ends 42 may extend about one quarter inch beyond the outlets 40 (see FIG. 4) for improving airflow and reducing noise. In the preferred embodiment, the outlets are spaced about one every four inches.

Figure 4:
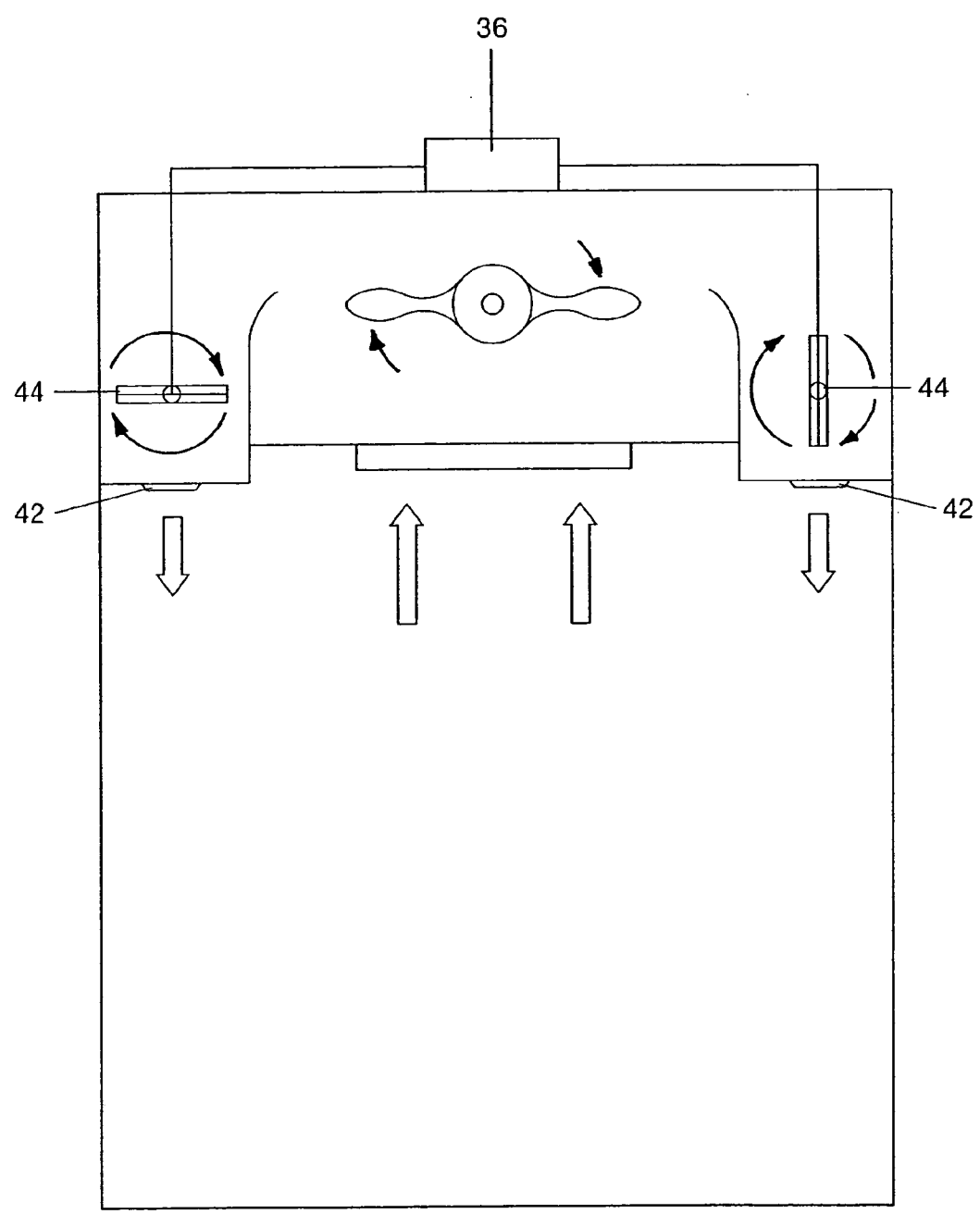
FIG. 4 is a top view of the convection oven.

As can be seen in FIG. 4, the convection oven 10 may include airflow baffles 44 for controlling the direction of airflow through the oven. The baffles are located one each, adjacent the opposing sidewalls 28, of the oven. The oven further includes an airflow control system 36 for controlling the airflow baffles 44.

In the preferred embodiment, the airflow control system 36 of the oven 10 rotates the baffles 44 to alternate the flow of air from one side to another. In the preferred embodiment, the baffles only partially block airflow wherein less than about 80% of the airflow passage is baffled. In the most preferred embodiment, the airflow control system further includes an alternating baffle system wherein the partial dampening ratio of un-baffled air to baffled air is about 70/30.

Preferably, the baffles 44 are rotated (alternated) two times per minute during baking. In other words, one of the baffles will move from open to closed and back to open twice in one minute, while at the same time, the opposite baffle moves from closed to open and back to closed twice in one minute. In the preferred embodiment, the alternating baffle rate is selected so that the airflow through the baffle has sufficient time to circulate through the oven before the air direction is changed in the oven.

Figure 5:
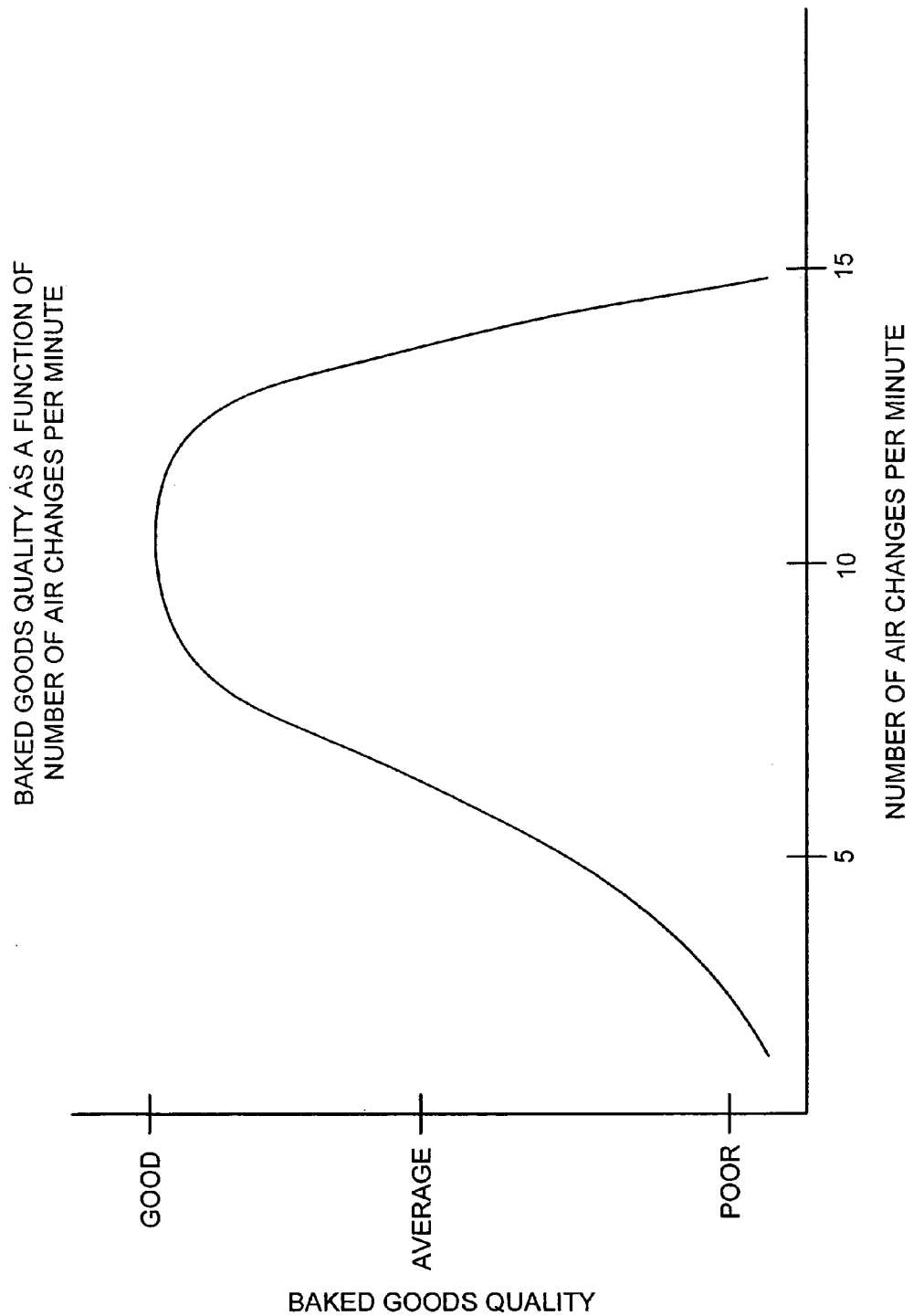
FIG. 5 is a graphical representation of baked goods quality as a function of number of air changes per minute.

Turning now to FIG. 5, the graph depicts baking quality on the Y-axis as a function of air changes per minute in the oven, depicted on the X-axis. It has been discovered through baking trials that the quality of goods baked in the oven generally increases with an increase in air changes in the oven until about 10 air changes per minute is achieved. At the same time, the time needed to bake the goods decreases as the air flow increases. However, after about 10 air changes per minute, the quality of goods baked in the oven decreases quickly. This phenomena appears similar to making toast where, once the bread is getting brown, it begins to toast more quickly and may more easily be burnt.

Figure 6:
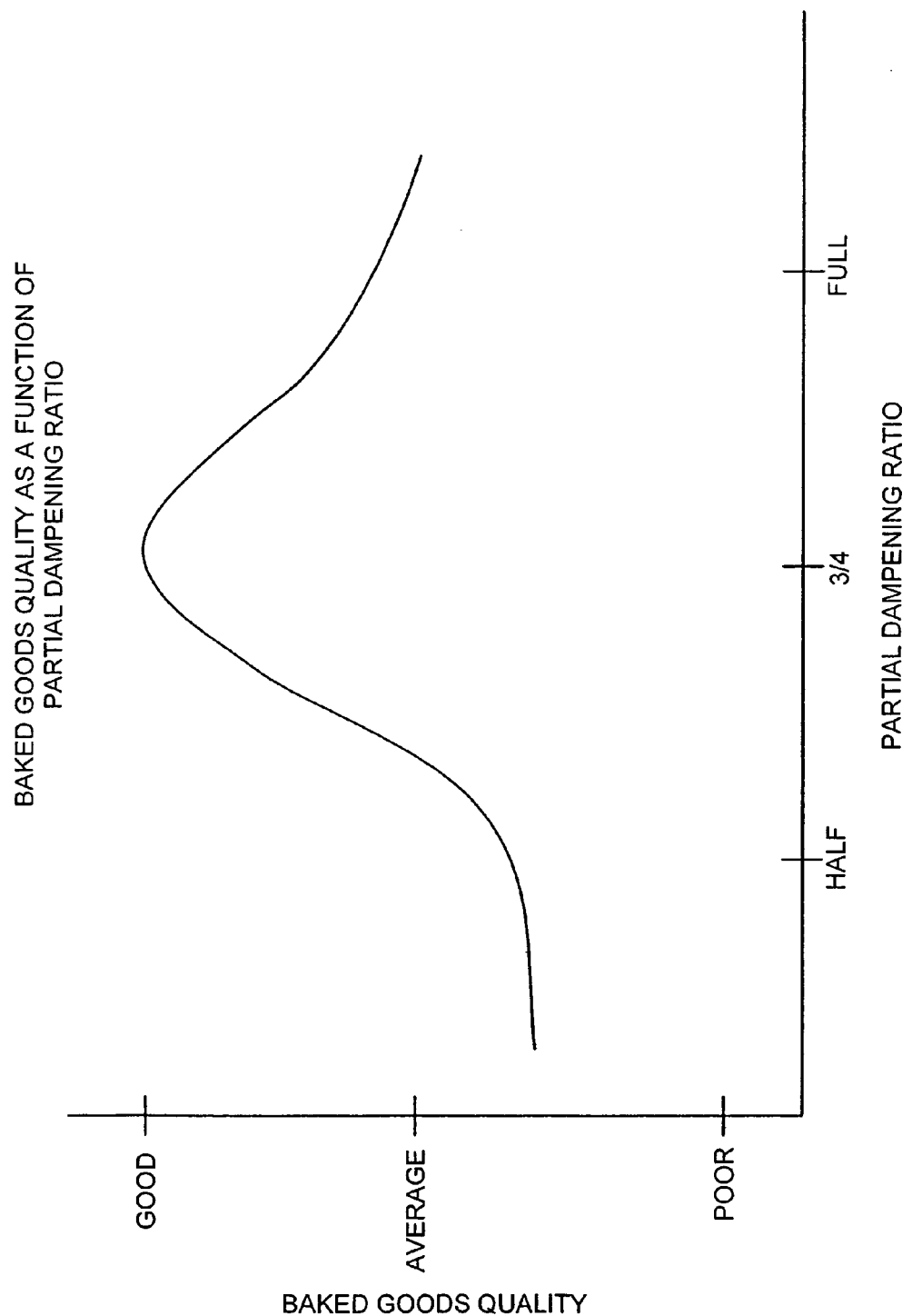
FIG. 6 is a graphical representation of baked goods quality as a function of the partial dampening ratio.

FIG. 6 is a graph of baked goods quality versus the partial dampening ratio of the airflow in the oven. The dampening occurs at a rate of two rotations (alterations) per minute at each level of alternating dampening. The Y-axis of the graph represents the baked goods quality and the X-axis represents the amount of dampening of airflow in the oven. As shown by the graph, baked goods quality increases as shown as partial dampening increases from 50 percent to about 70 percent baffling. There is little or no effect up at or below about 50 percent partial alternating dampening since, for example, at 50/50 partial alternating dampening there is little, if any, change in air flow direction as the baffles are rotated. Baked goods quality then decreases slightly as dampening is increased to about 95/5. This appears to be the practical upper limit for simple, unsealed baffles because of air leakage around the baffles.

Figure 7:
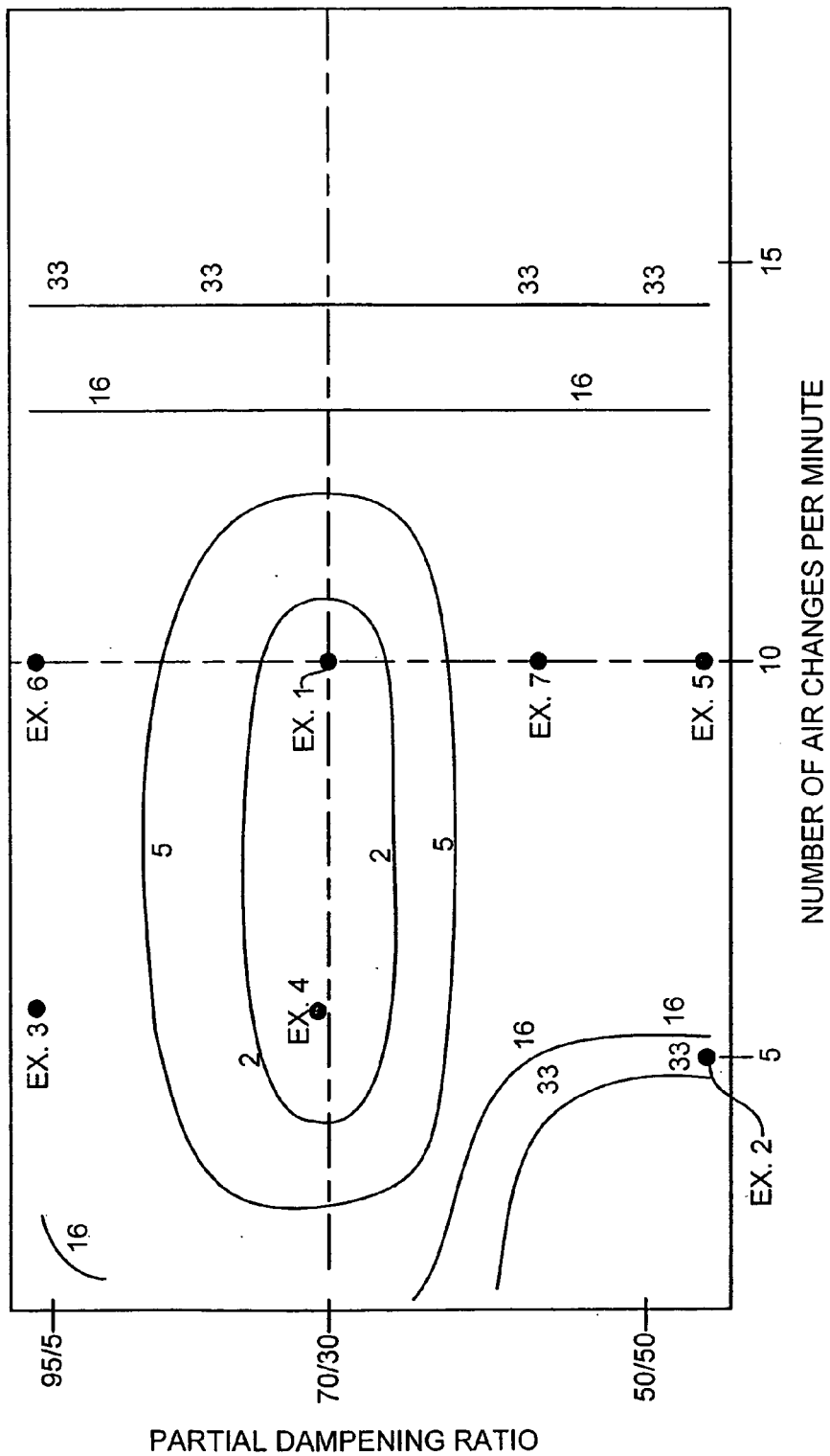
FIG. 7 is a graphical representation of the variation of the mean doneness value of the baked goods as a function of the partial dampening ratio and the number of air changes per minute.

FIG. 7 is graphical representation of the interaction of both of the factors shown in FIGS. 5 and 6. The data is shown as a response surface in which the statistical variation of the mean doneness value of the baked goods is shown in the Z direction as a function of the partial dampening ratio (Y) and the number of air changes per minute (X). As can be seen, the variation in the mean doneness value is greatly reduced by partial alternating dampening over a wide range of air changes per minute. The data in FIG. 7 was calculated, in part, from bakery trials in a batch-type convection oven constructed according to the present invention. While the tests were conducted using dinner rolls because of their difficulty in baking uniformly, other baked goods, such as breads, pies, and cakes, should bake equally well.

EXAMPLES 1–7

The following Examples 1A, 1B and Examples 2–7 were baked on trays in the cart in rows of 4 and columns of 5 which is representative of actual baking conditions. Each roll in the Examples was assigned a value of between 1 and 5, with 1 being most under baked and 5 being most over baked. The value "3" was assigned for the rolls most closely baked to the desired "doneness". The values were summed statistically using a conventional statistical program (Statiscope 1.0—available at www.df.lth.se) and normalized by dividing the measured S.D. by the range.

TABLE I

Figure 8B:
FIG. 8B is photograph of baked goods baked according to the present invention where the baked goods on the top portion and the bottom portion of the cart are substantially uniformly baked with respect to each other. In addition, 95% of the baked goods on the front portion and the back portion of the cart are within 30% of the mean doneness value of each other.
Figure 9:
FIG. 9 is photograph of baked goods baked according to the present invention without partial dampening at 5 air changes per minute where 95% of the baked goods on the cart are within 33% of the mean doneness value of all baked goods on the cart.
Figure 10:
FIG. 10 is photograph of baked goods baked according to the present invention at about 95/5 partial dampening at 5 air changes per minute where 95% of the baked goods on the cart are within 5% of the mean doneness value of all baked goods.

| Example No. | Figure No. | Results |
| --- | --- | --- |
| Baseline | Not Shown | Large variation in color with less than 5% of the baked goods on the cart are within 50% of the mean doneness value of all baked goods on the cart. |
| Present Invention - | | about 70/30 partial dampening at 10 air changes per minute. |
| Ex. 1A | FIG. 8A | 95% of the baked goods on the cart are within 50% of the mean doneness value of all baked goods on the cart. |
| Ex. 1B | FIG. 8B | baked goods on the top portion and the bottom portion of the cart are substantially uniformly baked with respect to each other. In addition, 95% of the baked goods on the front portion and the back portion of the cart are within 30% of the mean doneness value of each other; and wherein the baked goods on the top portion and the bottom portion of the cart are substantially uniformly baked with respect to each other. |
| Present Invention - | | without partial dampening at 5 air changes per minute. |
| Ex. 2 | FIG. 9 | 95% of the baked goods on the cart are within 33% of the mean doneness value of all baked goods on the cart at about 5 air changes per minute. |
| Present Invention - | | varying partial dampening at 5 air changes per minute. |
| Ex. 3 | FIG. 10 | 95% of the baked goods on the cart are within 5% of the mean doneness value of all baked goods on the cart at about 5 air changes per minute. |
| Ex. 4 | FIG. 11 | 95% of the baked goods on the cart are within 2% of the mean doneness value of all baked goods on the cart at about 5 air changes per minute. |
| Present Invention - | | without partial dampening at 10 air changes per minute. |
| Ex. 5 | FIG. 12 | 95% of the baked goods on the cart are within 16% of the mean doneness value of all baked goods on the cart at about 10 air changes per minute. |
| Present Invention - | | about 95/5 partial dampening at 10 air changes per minute. |

TABLE I-continued

Figure 13:
FIG. 13 is photograph of baked goods baked according to the present invention at about 95/5 partial dampening at 10 air changes per minute where 95% of the baked goods on the cart are within 2% of the mean doneness value of all baked goods on the cart.
Figure 14:
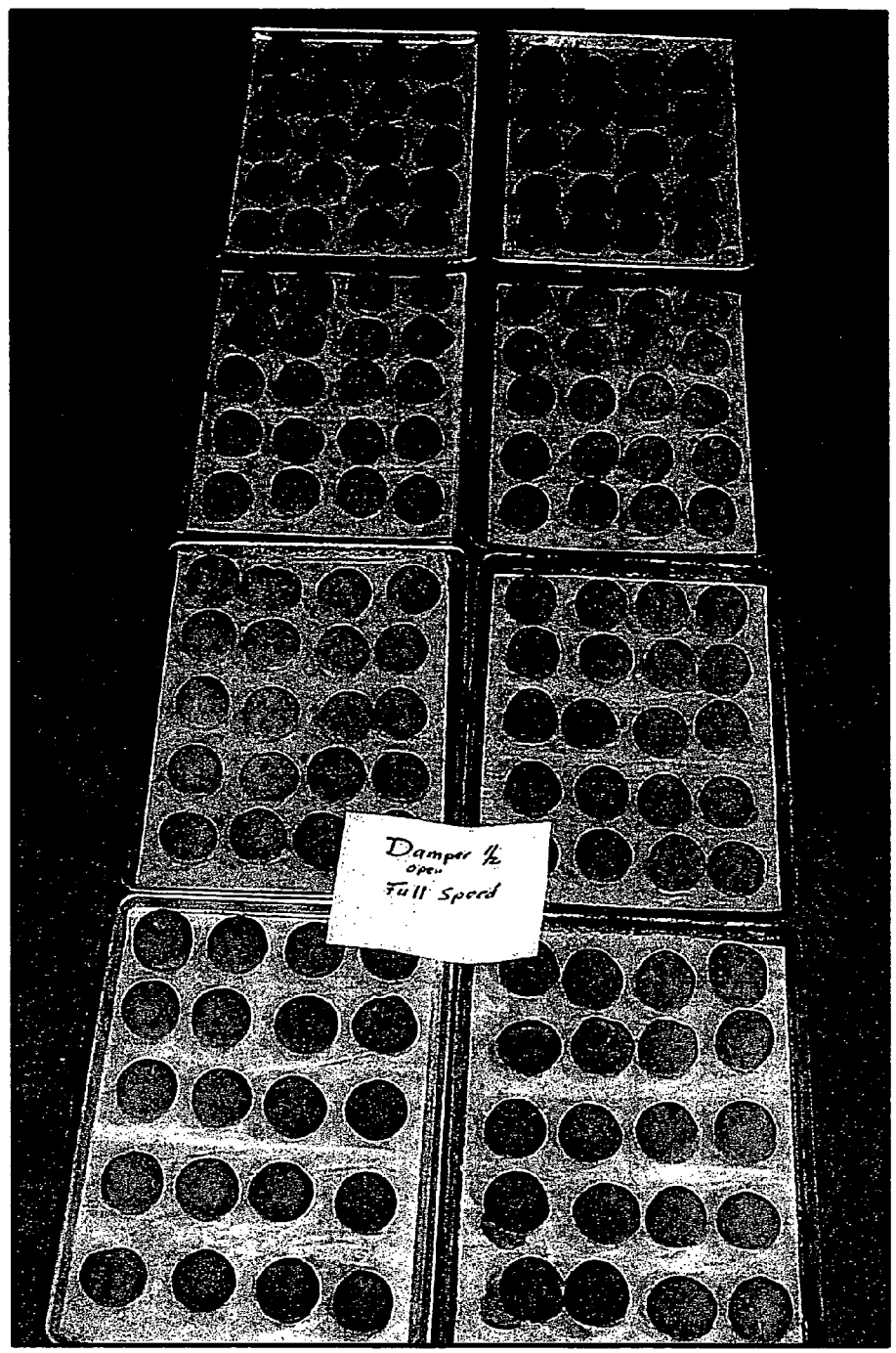
FIG. 14 is photograph of baked goods baked according to the present invention at about 50/50 partial dampening at 10 air changes per minute where 95% of the baked goods on the cart are within 16% of the mean doneness value of all baked goods on the cart.

| Example No. | Figure No. | Results |
| --- | --- | --- |
| Ex. 6 | FIG. 13 | 95% of the baked goods on the cart are within 2% of the mean doneness value of all baked goods on the cart at about 10 air changes per minute (cf. Ex. 3). |
| Present Invention - | | about 50/50 partial dampening at 10 air changes per minute. |
| Ex. 7 | FIG. 14 | 95% of the baked goods on the cart are within 16% of the mean doneness value of all baked goods on the cart at about 10 air changes per minute (cf. Ex. 5). |

Certain modifications and improvements will occur to those skilled in the art upon a reading of the foregoing description. By way of example, the outwardly flared air outlets could be replaced by truncated cones having a diameter decreasing from the air outlets on the plenum to final outlet at the end of the cones. In addition, the oven door can be placed on a sidewall of the oven and the vertically arranged air outlets can be on any of the walls of the oven, including the sidewalls. It should be understood that all such modifications and improvements have been deleted herein for the sake of conciseness and readability but are properly within the scope of the following claims.

We claim:

1. A method for operating a convection oven for bakery goods of the type having a front wall, a back wall, a pair of opposed side wall, a floor, a top and an opening in said front wall for permitting at least one multi-layer wheeled cart to be pushed into and removed from said oven, said method comprising the steps of:
    (a) circulating heated air in a closed path to the interior of said oven through at least two rows of vertically arranged air outlets;
    (b) receiving the heated air after it has passed through the interior of said oven through an air return located in one wall of said oven; and
    (c) varying the relative airflow rate of heated air through one of the air outlets with respect to another air outlet.

* * * * *